March 16, 1965 G. C. BAILEY 3,173,456
POWERED HAND TOOL FOR MANIPULATING BUNDLING STRAPS
Filed June 3, 1963 7 Sheets-Sheet 2

INVENTOR.
GEORGE C. BAILEY
BY John Babis Jr.
ATTORNEY.

March 16, 1965  G. C. BAILEY  3,173,456
POWERED HAND TOOL FOR MANIPULATING BUNDLING STRAPS
Filed June 3, 1963  7 Sheets-Sheet 4

INVENTOR.
GEORGE C. BAILEY
ATTORNEY.

INVENTOR.
GEORGE C. BAILEY
BY John Babis Jr.
ATTORNEY.

United States Patent Office 3,173,456
Patented Mar. 16, 1965

3,173,456
POWERED HAND TOOL FOR MANIPULATING BUNDLING STRAPS
George C. Bailey, East Orange, N.J., assignor to The Thomas & Betts Co., Incorporated, Elizabeth, N.J., a corporation of New Jersey
Filed June 3, 1963, Ser. No. 284,873
12 Claims. (Cl. 140—123.6)

The present invention relates to portable power actuated tools and more particularly to a fluid pressure operable hand tool adapted particularly for manipulating and operating upon plastic bundling straps individually in a uniform and precise manner at a high repetitive rate.

More specifically, the invention resides in a pneumatically operable hand tool which is particularly adapted for initially tensioning a plastic bundling or tie strap of the character exemplified in U.S. Patent No. 3,033,557, after it has been looped about a plurality of articles disposed in bunched parallelism, and for thereafter maintaining the strap under tension while operation of the tool is subsequently continued to twist the engaged body portion of the strap into a plane normal to its looped body portion to lock the strap upon itself against reverse movement, and severing the surplus free end portion thereof from its looped portion while forcefully ejecting the surplus end portion severed therefrom, rearwardly from the tool.

Heretofore, in the tieing of looped bundling straps, of the character herein identified, with known hand tools adapted for manipulating the same, it was necessary to bring the strap engaging elements on the jaws thereof, into a predetermined position relative to the engaged body portion of the strap, solely by the operator's skill or practice with the tool in order to bring the engaged body portion of the strap into alignment with a pair of aligned slots extending centrally across the eyelet in the head-end portion thereof for the purpose of securing the strap against reverse movement after being drawn taut, for example, about a plurality of insulated electric conductors disposed in bunched parallelism.

The aforesaid hand tools, however, possessed certain disadvantages in that to and fro movement of the jaw members to and from a predetermined position to place a strap under tension required an unreasonable degree of skill since any misjudgment resulted in the premature severance of the strap. Moreover, the production rate in the application of a large number of such straps on a group of bunched insulated conductors, for example, was relatively low, more or less inefficient and unreasonably costly in man hours.

Accordingly, it is an object of the invention to provide a portable power operable hand tool of the character herein described whereby the above noted disadvantages are obviated.

Another object of the invention is to provide a power operable hand tool of the character herein described whereby an inexperienced operator can tie large quantities of bundling straps in the shortest possible time with maximum efficiency as compared to the production rate of the most experienced operator using a known type of hand tool adapted for the purpose.

A further object of the invention is to provide a hand tool of the character described wherein a bundling strap, when looped about a group of articles, is placed under a predetermined degree of tension automatically in response to initially moving its handle members manually toward each other.

With the above and other objects in view, the invention resides in the novel construction, and arrangement of parts, the novel features of which are set forth with particularity in the appended claims, the invention itself, however, both as to its organization and method of operation, together with additional objects and advantages thereof, being best understood from the following description of a specific embodiment thereof, when taken in connection with the accompanying drawings in which:

Figure 1:
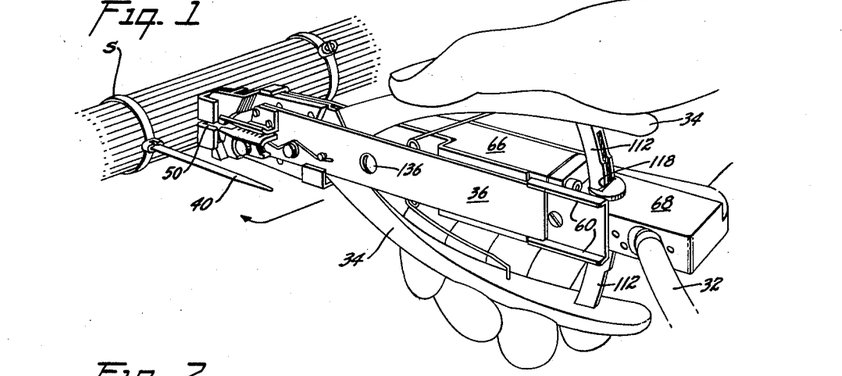
FIGURE 1 is a perspective view, illustrating the subject hand tool as connected to a source of air pressure and as initially brought into sidewise engagement with the extended free end portion of a looped bundling strap, preparatory to automatically drawing the same taut on and about a bundle of insulated conductors.
Figure 2:
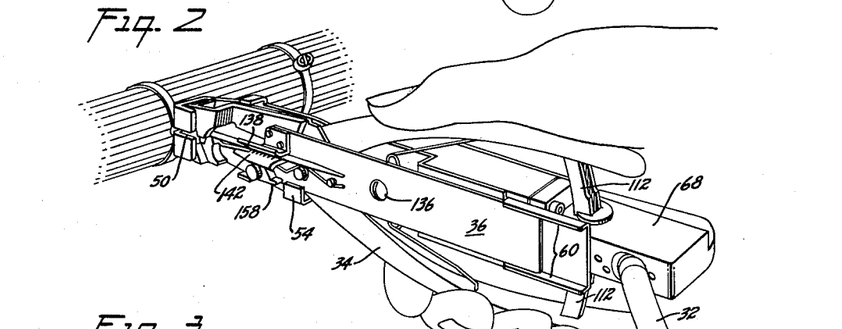
FIGURE 2 is a similar view illustrating the hand tool of FIGURE 1, after the bundling strap has been automatically drawn taut by a relatively movable member of the tool in response to initial movement of its handle members toward each other.
Figure 3:
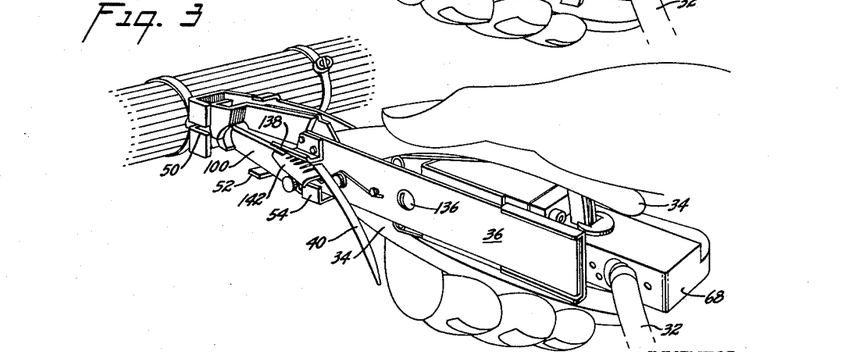
FIGURE 3 is a similar view illustrating the hand tool of FIGURE 2, after it has been brought to strap cut-off and surplus end portion ejecting position in response to final manual movement of its handle members toward each other whereupon the tool is freed of the severed end of the looped strap which locks upon itself against reverse movement, as shown at bottom left of FIGURE 3, at which time release of said handle members from a manually actuated position causes a gripping and tensioning member to be automatically returned to its forward position for another cycle of operation.

Referring to the drawings, the power tool 30. constituting the subject matter of this application, is shown in FIGURE 1, as rendered active by connection to a required air pressure line 32; as held in the hand of an operator and with its handle members 34 in normal inactive position to cause a reciprocable member 36 to be moved forwardly automatically to open a strap gripping means 38, to receive an extended free end portion 40 of a looped bundling strap S therebetween, whereby the strap is gripped upon closure of the gripping means 38 thereon in response to reverse movement of the reciprocable member 36, upon initial movement of the handle members 34 toward each other, whereby the looped strap S is drawn taut to a predetermined degree of tension, as exemplified in FIGURE 2; and finally to subsequently sever the surplus end portion 40 of the strap S from its looped portion while under tension, and eject the same from the tool 30, upon further movement of its handle members 34 toward each other, as in FIGURE 3, whereupon the severed end of the looped strap S is free to recede and lock upon itself as shown in the insert in FIGURE 3, and the reciprocable member 36 thereafter returned to its maximum forward position, as in FIGURE 1, upon release of the handle members 34 while the air pressure remains on the tool whereby the member 36 is maintained in operative position for another cycle of operation.

Figures 4, 5:
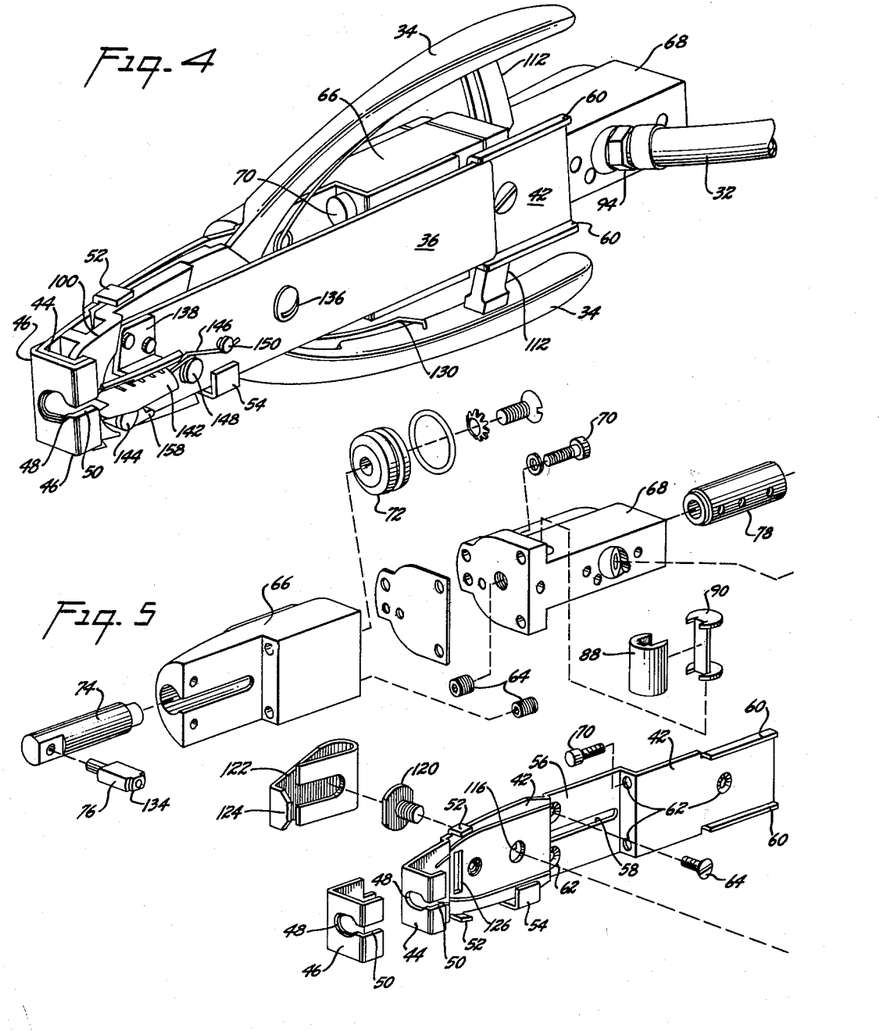
FIGURE 4 is a nose-end view in perspective of the hand tool.
FIGURES 5 and 5a are exploded views showing all the constituent parts of the tool in a detached sequence of assembly relation.

Referring to FIGURE 4, the subject power tool 30 is shown in a nose-end perspective view with its handle members 34 in normal open position, in which the tensioning member 36 and its correlated strap gripping means 38 are in an inactive position of rest as when the supply of air-pressure 32 has not been connected to the tool.

As shown, the flat nose-end of the tool 30 is provided with a slotted opening therethrough into which the extended free end portion 40 of a looped strap S is extended or received either endwise or sidewise, in each cycle of operation, for a gripping operation thereon by a gripping means 38, after the same has been rendered operative by the restoration of the required air pressure on the tool, and the looped strap placed under tension in response to an initial movement of the handle members toward each other.

Figures 5A, 6:
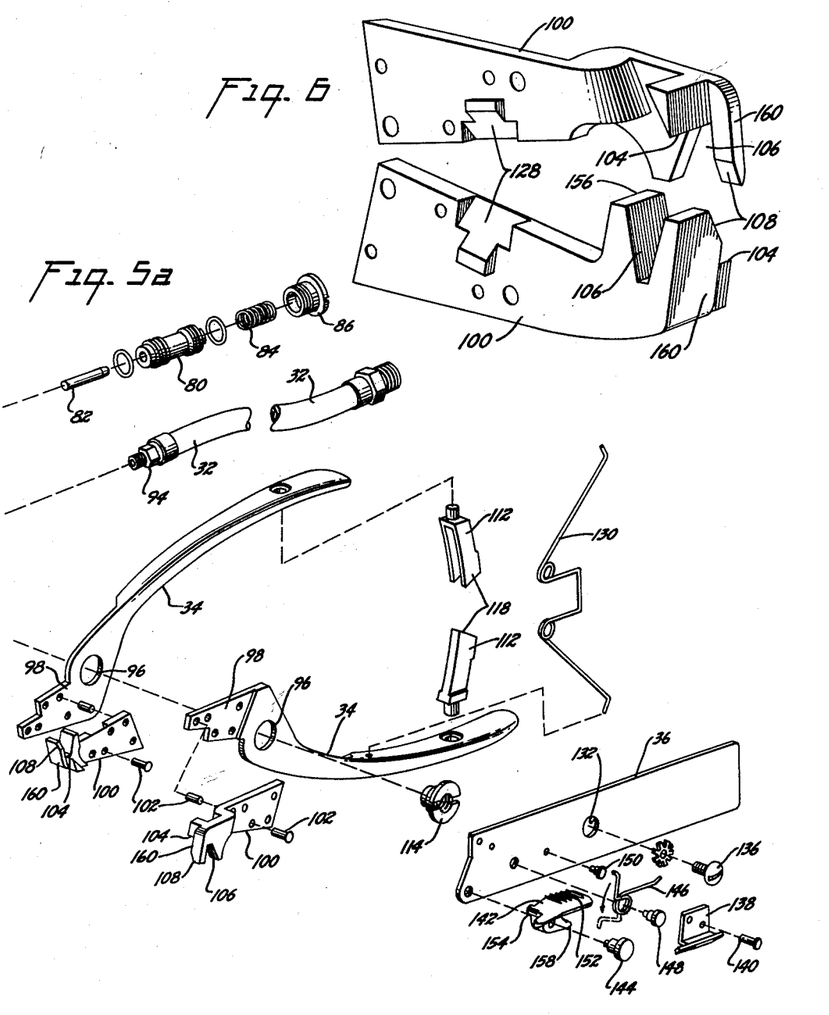
FIGURE 6 is a perspective view of the jaw members per se, of the tool in their respective coactable positions in which they are secured to the nose-end of the pivoted handle members thereof.

As shown in an exploded view which has of necessity, been divided into FIGURES 5 and 5a, the subject power tool 30 comprises a mounting plate 42, in the form of an elongated, substantially rectangular sheet metal stamping having one end portion thereof reversely bent upon itself in spaced right angular relation to provide a flat nose-end portion 44, having a double thickness by virtue of a matching cap 46, secured thereon as by spot welding, for example, said thickened nose-end 44 having a substantially oval opening 48 centrally through its end face and a linear slot 50, midway of the free side face of its nose-end portion 44, in parallelism with the axial center of said opening 48, and in communication therewith. The mounting plate 42 is further provided adjacent its nose-end portion 44, with a plurality of right angularly extending ears 52 and 54, integral therewith along its opposite marginal edge serving as limiting stops for correlated elements presently to be described.

As clearly shown in FIGURE 5, the intermediate portion of the mounting plate 42, presents a right angularly stepped or offset portion 56, having a central elongated clearance slot 58 therethrough and extending lengthwise thereof for the extension therethrough of a power actuated member as hereinafter described. The opposite end portion of the mounting plate 42 is provided along a portion of each of its opposite margins with a short, right angularly extending flange 60, bent out of the plane thereof to form a channel for guiding one end of the reciprocable member 36, hereinafter described. Finally, the mounting plate 42 is also provided with a series of clearance openings 62, therethrough for the reception of a plurality of assembly screws and the like as indicated at 64.

Figure 7:
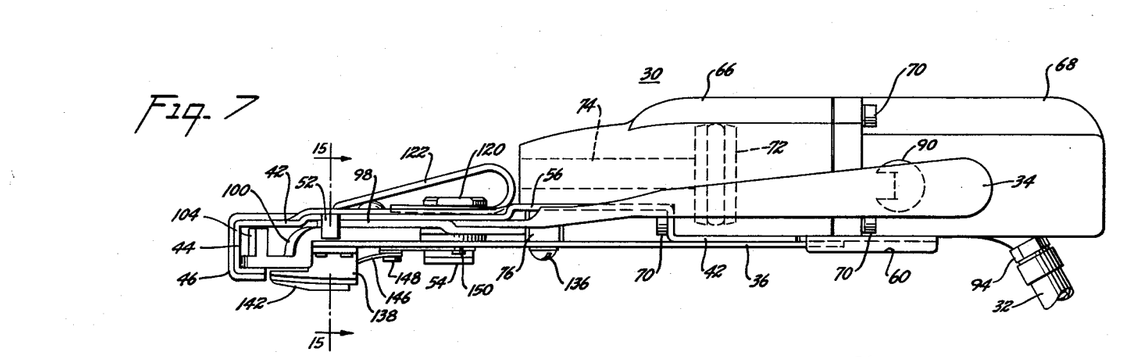
FIGURE 7 is a top edge view of the tool in elevation.

In accordance with the invention and as best shown in FIGURES 5, 7, 11, 12 and 13, a double acting or four-way "in line" valve assembly as shown in FIGURE 5 and partly in FIGURE 5a comprises an air cylinder 66, and a valve body 68, adapted to be connected in end to end relation by means of suitable cap screws 70, a piston 72, including a connecting rod 74, and a drive pin 76 assembly, being correlated with the air cylinder 66. A valve sleeve 78, valve 80, push pin 82, valve spring 84, valve plug 86, guide sleeve 88, and a valve actuator 90, assembly being likewise correlated with the valve body 68. Thus, the air-cylinder 66 and the valve body 68 are secured as a unit lengthwise of and on one side of the mounting plate 42 by means of suitable cap screws, as best shown in FIGURE 7, whereby to provide an air-drive unit adapted to be connected, by means of the hose connection 34 to a source of compressed air at 55 to 65 pounds per square inch (not shown) by means of a connecting nipple 94, adjacent the rear end of the valve body 68.

Figure 11:
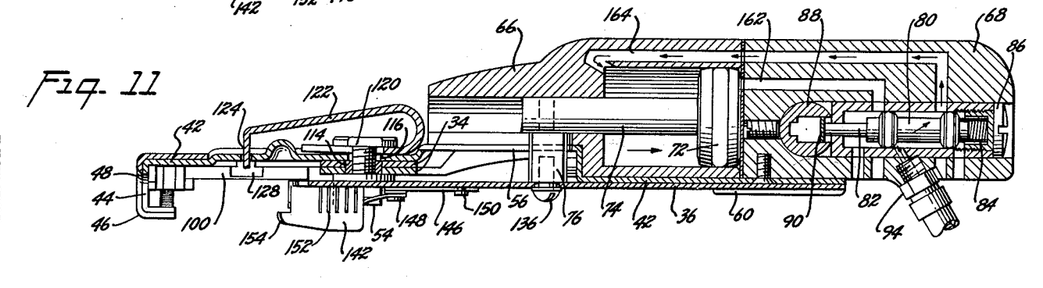
FIGURE 11 is a similar longitudinal sectional view showing the reciprocable parts thereof in full rearward position.
Figure 12:
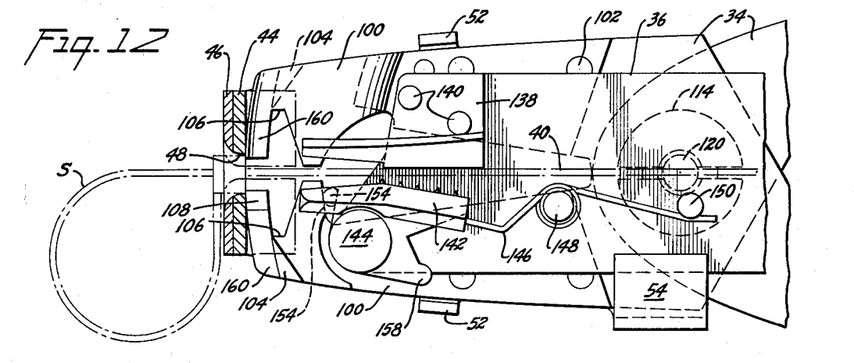
FIGURE 12 is an enlarged side elevational view of the head-end portion of the tool, partly in section, and showing a looped strap as received in and through an apertured nose-plate, and as engaged by a pair of gripping members mounted on a reciprocable tensioning means upon relative movement thereof in response to initial manual movement of a pair of handle members toward each other.
Figure 13:
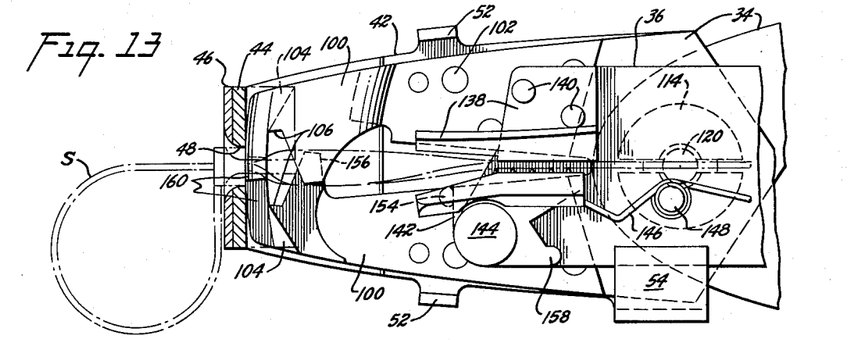
FIGURE 13 is a similar enlarged side elevational view showing the looped strap as having been placed under tension by a reciprocable tensioning means, in response to initial manual movement of the handle members toward each other, and the engaged portion of the strap as twisted into a plane normal to its looped portion in response to further manual movement of the handle members toward each other.

Further, in accordance with the invention and as best shown in FIGURES 11 through 13, the free end portion of the drive pin 76 is internally screw-threaded and extends through the elongated clearance slot 58, provided therefor in the offset portion 56 of the mounting plate 42, for the connection thereto of the reciprocable member 36 or tension plate hereinafter described.

Referring now to FIGURES 5a, and 6 through 10, the handle members 34 of the power tool 30 are each provided with a pivot bearing opening 96 in the short, flat nose-end portion thereof to each of which a special jaw member 100, each complementary to the other, is secured as by means of rivets 102 or the like. Each of the jaw members 100 is provided with a laterally offset cutting or knife edge 104, a clearance cavity 106 for each of said knife edges 104, and an inclined strap manipulating edge portion 108. As best shown in FIGURE 5a, the handle members 34 are further provided adjacent their opposite ends with male and female substantially arcuate camming members 112, having one end thereof fixedly secured in the inner side of said handle members at right angles thereto, one of said arcuate camming members 112 having a bifurcated free end portion adapted to receive the free end portion of the opposite or male camming member 112 therebetween, as presently to be described.

Figure 9:
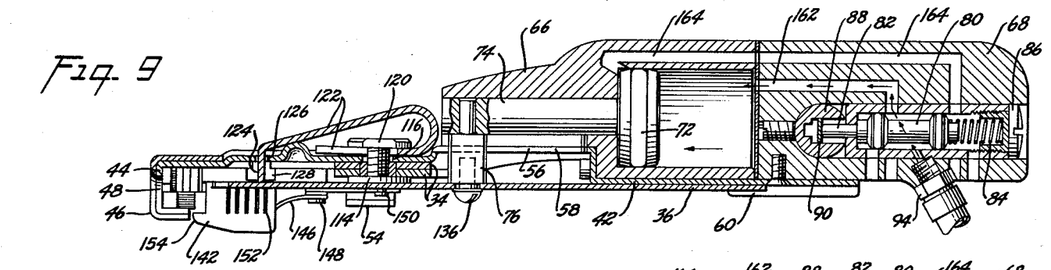
FIGURE 9 is a longitudinal sectional view taken on the line 9—9 of FIGURE 8, showing the reciprocable parts thereof in full forward position.
Figure 10:
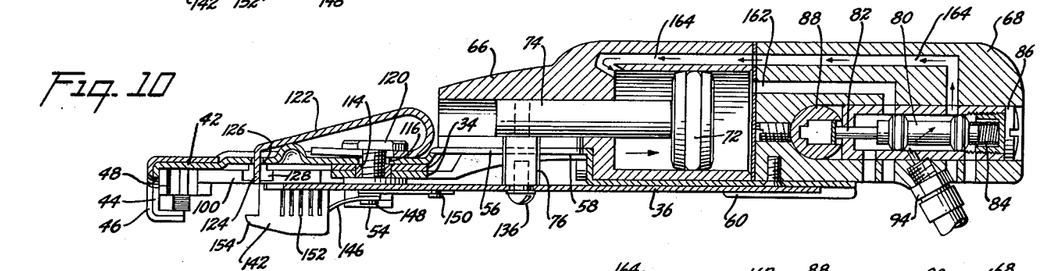
FIGURE 10 is a similar longitudinal sectional view showing the reciprocable parts thereof in an intermediate position.

The handle members 34 are pivotally connected in scissors fashion to the opposite side of the mounting plate 42, by means of an internally screw threaded, flanged bushing 114, which extends through the matched bearing openings 96 in said handle members 34, and into the bearing opening 116 in said mounting plate 42, with the free camming ends 118 of the arcuate members 112 on said handle members 34 inserted into coactable relation with and between the guide sleeve 88 and the valve actuator 90, disposed in said valve body 68, as seen in FIGURE 9. With the handle members 34 so positioned, a flat, button head screw 120 disposed in the open slotted end of a folded plate tension spring 122, as indicated in FIGURE 5, is threaded into the bushing 114 from the other side of the mounting plate 42, and a suitable tool used on the slotted flange end of the bushing 114, to securely pivot the handle members 34 on one side of the mounting plate 42, and the tension spring 122 on the other side thereof with its right angularly bent free end shown partially tapered as at 124, projecting through a rectangular clearance opening 126 in said mounting plate 42 for a purpose now to be described.

Figure 8:
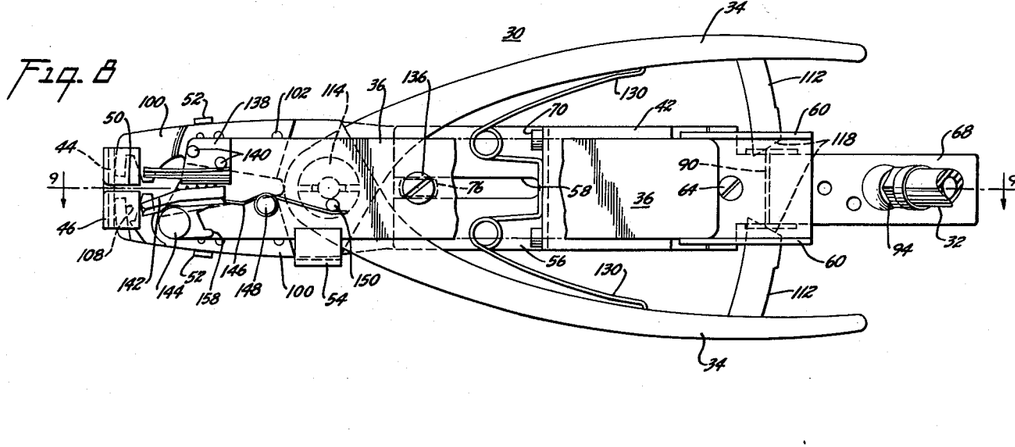
FIGURE 8 is a side elevational view of the same.

Further in accordance with the invention and as best shown in FIGURES 11, 12, 13, 17, 18 and 19, the inner side of the jaw members 100, per se as shown in opposite side perspective in FIGURE 6 are each provided, intermediate their ends with an inclined dwell 128 or the like, which dwells coact with the tapered free end 124 of the tension spring, projecting through the opening 126 in the mounting plate 42, whereby the handle members 34 of the tool 30, including the jaw members 100 in their angular movement toward and away from each other, are controlled in angularly centered relation relative to the longitudinal center line through the mounting plate 42, and/or the axial center of the opening 48 in the nose-end thereof and the jaws 100, thus adapted to be brought together uniformly with respect thereto by centering action of the folded plate tension spring 122 thereon, when the handle members 34 are actuated toward each other in the operation of the tool, a coiled wire spring 130 being suitably interposed between the handle members 34 whereby they are separately biased to full open position as best shown in FIGURE 8.

Further in accordance with the invention and as best shown in FIGURES 5, 5a, 7, 8, 11, 12 and 13, a power actuated strap tensioning means comprises the tension plate 36, which is held against the outer face of the rear half-end portion of the mounting plate 42 with its rear end portion slidably supported by the opposed flanges 60 provided therefor on the rear end portion of the mounting plate 42, the tension plate 36 being provided intermediate its ends with a suitable opening 132 therethrough adapted to receive the internally threaded and reduced end 134 of the drive pin 76 therein and secured thereto by means of a lock washer and machine screw 136. Thus, the tension plate 36 is adapted for movement with the piston 72 in the air cylinder 66, and in coaxial alignment with the axial center of the opening 48, in the nose-end 44 of the mounting plate 42.

As best shown in FIGURES 4, 5a, and 14 through 16, the front or opposite end portion of the tension plate 36 is provided on its exposed side with a strap gripping means which comprises a right angular stop plate 138, having one leg thereof suitably secured to the upper corner portion of the front end of said tension plate 36, as by means of rivets 140, for example, and a similarly shaped overriding pawl 142 pivotally mounted on the lower corner portion of the tension plate 36 in coactable engagement with the fixed stop plate 138, by means of a fixed hinge pin 144, the overriding pawl 142 being normally biased into engagement with the stop plate 138 by means of a looped wire spring 146 pivoted intermediate its ends on the tension plate 36, as at 148, with one free end thereof disposed under a fixed pin 150, and its opposite free end bearing against the underside of the pivoted pawl 142. To facilitate the sidewise entrance of an extended end portion 40 of a looped strap S, between the stop plate 138 and the pivoted pawl 142, the laterally extended leg portion of the stop plate 138 and pawl 142 have their respective marginal edge portions oppositely curved as shown in FIGURES 17, 18 and 19, the top face of the pawl 142 being suitably serrated, knurled or otherwise scored, as at 152 in FIGURE 5a, to provide for a biting grip on an extended end portion 40 of the strap S.

Figure 14:
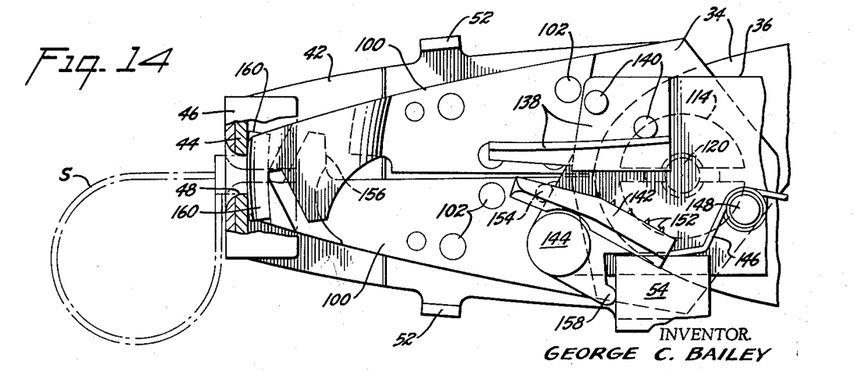
FIGURE 14 is a similar enlarged side elevational view showing the jaws of the tool as having been moved to cut-off position, and the strap gripping means as having been actuated into open position for the ejection of the surplus free end portion of the engaged strap upon final relative rearward movement of the strap tensioning means in response to maximum manual movement of the handle members toward each other.
Figure 15:
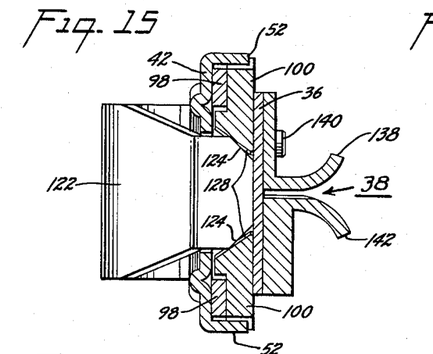
FIGURE 15 is an enlarged transverse sectional view taken on the line 15—15 of FIGURE 7, showing the jaw members held in their full open position by a centering spring plate.
Figure 16:
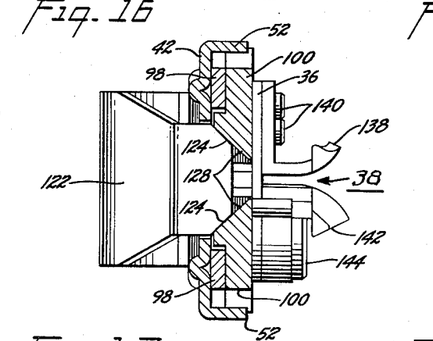
FIGURE 16 is a similar view showing the jaw members moved further toward each other against the inclined edges of the jaw centering spring plate.
Figure 17:
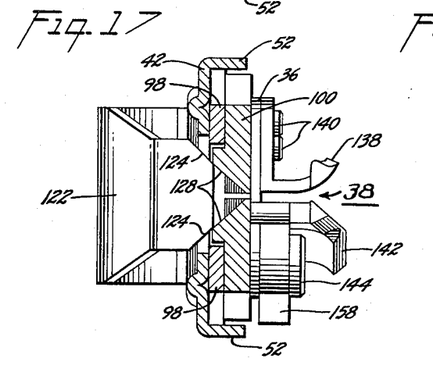
FIGURE 17 is a similar view showing the jaw members moved further toward each other to strap severing position and the jaw centering spring plate biased to its maximum outward position.

Further in accordance with the invention and as best shown in FIGURES 14, 15 and 16, the overriding or pivoted pawl 142 is adapted to have angular movement or to be rocked in a clockwise direction relative to the fixed stop plate 138, by means of an upper, front camming lug 154 integral therewith and adapted to coact with an inner cam face 156 on the lower jaw member 100 upon maximum forward movement of the tension plate 36, when air pressure is on the tool and its handle members are in fully open position, whereby the pawl 142 is inclined or canted away from the stop plate 138 for the free insertion of a strap end portion S, loosely therebetween. The opposite edge face of the pawl 142 is similarly provided with a lower, rearwardly extending camming lug 158, formed integral therewith and adapted to coact with a stop lug 54, formed on the bottom margin of the mounting plate 42, and spaced in parallelism therewith, into the path of the pawl 142 for engagement therewith upon forced or power actuated rearward movement of the tension plate 36, under control of the handle members 34, upon their maximum movement toward each other to rock the pawl 142 about its pivot 144 to the position shown in FIGURE 16, whereby to eject or discard a severed end portion of a looped strap S from the tool as exemplified in FIGURE 3.

Figure 18:
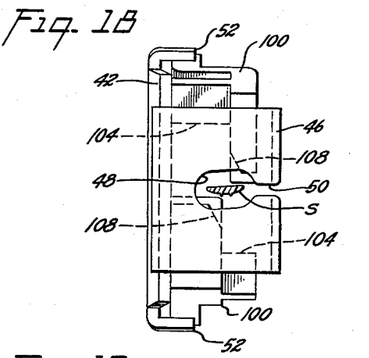
FIGURE 18 is an end elevational view of the nose-end of the tool showing an extended free end portion of a looped, taut strap extending through the nose-plate thereof and between a pair of angularly movable jaw members preparatory to engaging the same for a twisting operation thereon in response to initial movement of its handle members toward each other.
Figure 19:
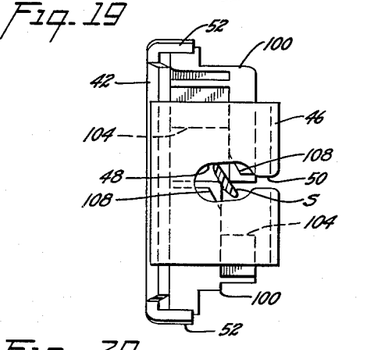
FIGURE 19 is a similar view showing the jaw members of the tool in initial engagement with the free end portion of a looped, taut strap and as about to twist the engaged portion, relative to its looped portion, through an angle of 90 degrees in response to further movement of the handle members toward each other.
Figure 20:
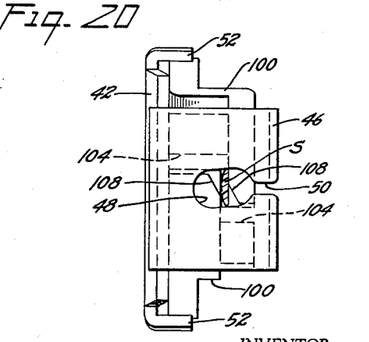
FIGURE 20 is a similar view showing the jaw members of the tool as moved to the position in which they have (erected) twisted the engaged portion of the strap, normal to its looped portion while under tension, and in which position the twisted portion of the strap is severed from its engaged free end portion upon further movement of the jaw members toward each other.

Further in accordance with the invention and as best shown in FIGURE 6, the nose-end of the respective jaw members 100, are also adapted to coact during manual movement thereof for manipulating an engaged end portion of a looped strap S, as exemplified in sequence in FIGURES 18, 19 and 20, whereby to turn the engaged portion of the strap through an angle of 90 degrees, relative to its looped portion, for the purpose of locking the strap upon itself as exemplified in FIGURES 1, 2 and 3. To this end, the jaw members 100 are also provided with opposed, complementary angular edge faces, as indicated at 108 in FIGURE 6, which are so arranged, spaced and proportioned with respect to each other and the engaged portion of a looped strap S, therebetween, that in the final movement of the jaw members toward each other, the angular faces 108 engage the opposite sides of the engaged strap portion at a point adjacent the marginal edges thereof and turn the engaged strap portion in a clockwise direction, as in FIGURE 19, until the jaws have been moved to final position, as in FIGURE 20, in which the turned strap portion S is disposed in-between the nose-ends 160, of the jaw members 100 in a transverse direction, as seen in FIGURE 20, and between the nose-end 44 of the tool and the strap gripping means 38, lengthwise thereof as seen in FIGURE 13. Thus, upon maximum movement of the jaw members 100, in response to final movement of the handle members 34 toward each other, the respective margins of the engaged strap portion S, will be within the path of the knife or cutting edges 104 on said jaw members 100, and severed sufficiently toward its center to permit the substantially severed strap portions to be pulled apart or separated by the pull exerted thereon by the tension plate 36.

Thereafter, the tension plate 36 is driven to its full rearward position in which the pawl 142 strikes the stop lug 54, as in FIGURE 14, and rocked clockwise and the engaged, free-end portion of the looped strap S, thus released and ejected therefrom, the twisted end portion of the looped strap having in the meantime receded into its head-end portion and locked upon itself in the manner shown in FIGURE 3, and in Patent 3,022,557. The subsequent release of the handle members 34, to their normal open position renders the tool operable when connected to a constant supply of the required air pressure to return the tension plate 36 to its extreme forward position, as shown in FIGURE 9, in which the pawl 142 is biased out of engagement with the stop plate 138 for the sidewise reception of another looped strap portion therebetween and the initiation of a strap tensioning cycle.

It is to be observed that in the foregoing description of the subject tool, the connection thereto of a constant supply of necessary air pressure as operable on the piston 72, housed in the air cylinder 66 to reciprocate the tension plate 36 in response to initial and subsequent manual movement of the handle members 34 toward each other, whereby the valve 80 is positioned through the guide sleeve 88, valve actuator 90, and push pin 82 to cover or uncover one or the other of a pair of air passages 162 and 164, for selectively directing air pressure against either side of the piston 72, is to be understood.

While the invention has been illustrated and described with respect to a preferred embodiment thereof, it is to be expressly understood that various changes and modifications may be made therein without departing from the inventive concept underlying the same. Therefore, the invention is not to be limited except as is necessitated by the prior art and the scope of the appended claims.

I claim:

1. A pneumatically operable hand tool adapted for manipulating and tensioning a looped bundling strap wherein a four-way valve and an actuator means therefor are adapted to be controlled by a pair of complementary, arcuate camming members, each integral with each of a pair of pivotally mounted, spring influenced handle members in response to movement thereof toward each other in a plurality of successive stages to automatically operate a reciprocable strap gripping and tensioning means relative to the nose-end of said tool, said handle members including integral jaw members provided with complementary means adapted to twist a portion of said strap through an angle of 90 degrees and additional complementary means for subsequently severing the surplus end portion of said strap from its looped portion upon final movement of said handle members toward each other.

2. A pneumatic hand tool of the character described comprising a reciprocatory pressure responsive unit including a four-way valve and an actuator means therefor mounted on one side of an elongated frame plate having an elongated slot midway of its length and an apertured end portion bent normal thereto providing a flat nose-end portion, a pair of spring biased handle members including integral jaw members pivotally mounted on the opposite side of said frame plate with the nose-end of said jaw members in slidable engagement with the inner face of the apertured nose-end of said frame plate, resilient means in coactable engagement with said jaw members adapted to center angular movement thereof with respect to the axial center of said apertured nose-end portion, an elongated plate member mounting a spring biased gripping means adjacent one end thereof slidably mounted on said frame plate outwardly of said handle members with said gripping means in alignment with the axial center of said apertured nose-end, and means extending through said elongated slot connecting said elongated plate member with said pressure responsive unit, said gripping means being adapted to coact with a cam surface on the inner face of one jaw member to condition the same for the reception of the extended free end portion of a looped strap when said unit is connected to a constant air pressure supply line.

3. The invention set forth in claim 2, characterized further in that said handle members each include an integral, arcuate camming member in complementary relation whereby to displace said valve actuator means upon initial movement of said handle members toward each other to initiate rearward movement of said elongated plate member whereby said gripping means is rendered active to grip an extended free end portion of a looped strap and to place the same under tension.

4. The invention set forth in claim 2, characterized further in that said gripping means comprises a stop plate secured adjacent one end of said elongated plate member, and a spring influenced overriding pawl pivotally mounted on said plate member in coactable engagement with said stop plate, said pivoted pawl having a serrated top face and a forwardly projecting end portion adapted to engage said cam surface on the inner face of said jaw member to rock the same out of engagement with said stop plate upon maximum forward movement of said plate member in response to initial movement of said handle members toward each other.

5. The invention set forth in claim 2, characterized further in that said frame plate includes an integral, laterally projecting lug formed on its lower marginal edge, and said overriding pawl, a rearwardly projecting end portion adapted to engage said lug upon maximum rearward movement of said elongated plate member whereby said pawl is rocked clockwise to release an engaged free-end portion of a looped strap.

6. The invention set forth in claim 2, characterized further in that the nose-end of said jaw members is constituted by a pair of opposed, laterally spaced hook-like members each presenting an inclined inner edge face extending from its free end, in opposed relation with their free end faces adapted to come down on the opposite marginal edge portions of an engaged free end portion of a looped strap, when extended through said apertured nose-end, upon further movement of said handle members toward each other whereby the engaged portion of said strap is turned over by said jaw members on said inclined inner faces through an angle of 90 degrees and disposed between the hook-like ends of said jaw members in parallelism therewith.

7. The invention set forth in claim 2, characterized further in that the nose-end of each of said jaw members includes a transverse knife edge to one side of the angled inner end face of each of said opposed, laterally spaced jaw members whereby said knife edges engage the opposite marginal edges of a turned or twisted end portion of a looped strap, when engaged by and manipulated by said laterally spaced arcuate members, and shear said strap from its opposite margins toward its center while under tension upon final movement of said handle members toward each other.

8. The invention set forth in claim 2, characterized further in that the apertured nose-end portion of said frame plate is slotted lengthwise thereof to permit sidewise entry of a strap end portion thereinto, said nose-end portion being provided with a matching nose-end cap in welded relation with the outer defining edge of said aperture and slot beveled to provide a recess for receiving the head end portion of a looped strap.

9. The invention set forth in claim 2, characterized further in that said resilient means, adapted for centering angular movement of said jaw members with respect to the axial center of said apertured nose-end portion of said tool, comprises a section of flat spring plate folded upon itself with one end portion thereof secured to said frame plate by the pivot means attaching said handle members thereto, the free end portion of said spring plate being tapered and projecting through a rectangular opening in said frame plate into engagement with a complementary dwell provided therefor on one side of each of said jaw members.

10. A pneumatically operable hand tool having an apertured, longitudinally slotted nose-end portion adapted for manipulating and tensioning a looped bundling strap wherein a reciprocatory unit including a four-way valve and an actuator means therefor are adapted to be controlled by a pair of complementary, arcuate camming members, each integral with each of a pair of pivotally mounted, spring influenced handle members in response to movement thereof toward each other in a plurality of successive stages to automatically operate a reciprocable strap gripping and tensioning means relative to the nose-end of said tool, said handle members including integral jaw members provided with complementary means adapted to twist a surplus end portion of a tensioned strap through an angle of 90 degrees, when positioned between the nose-end of said jaw members and said strap gripping means, and additional complementary means for subsequently severing the surplus end portion of said strap from its looped portion upon final movement of said handle members toward each other.

11. A pneumatically operable hand tool having an apertured, longitudinally slotted nose-end portion adapted for manipulating and tensioning a looped strap wherein a reciprocatory unit including a four-way valve and an actuator means therefor are adapted to be controlled by a pair of complementary, arcuate camming members each integral with each of a pair of pivotally mounted, spring influenced handle members in response to movement thereof toward each other in a plurality of successive stages to automatically operate a reciprocable strap gripping and tensioning means relative to the nose-end of said tool, said handle members including integral jaw members provided with complementary means adapted to twist a tensioned end portion of a looped strap through an angle of 90 degrees, when positioned between the nose-end of said jaw members and said strap gripping means, and additional complementary means for subsequently severing the surplus end portion of said strap from its looped portion upon final movement of said handle members toward each other whereby said strap gripping means is actuated by a stop means in the path thereof to release the severed end portion of said strap therefrom.

12. A pneumatically operable hand tool having an apertured, longitudinally slotted nose-end portion adapted for manipulating and tensioning a looped strap wherein a reciprocatory unit including a four-way valve and an actuator means therefor are adapted to be controlled by a pair of complementary, arcuate camming members each integral with each of a pair of pivotally mounted, spring influenced handle members in response to movement thereof toward each other in a plurality of successive stages to automatically operate a reciprocable strap gripping and tensioning means relative to the nose-end of said tool, said handle members including integral jaw members provided with complementary means adapted to twist a tensioned end portion of a looped strap through an angle of 90 degrees, when positioned between the nose-end of said jaw members and said strap gripping means, said jaw members being further provided with additional complementary means for subsequently severing the surplus end portion of said strap from its looped portion upon final movement of said handle members toward each other whereby said strap gripping means is actuated by a stop means in the path thereof to release the severed end portion of said strap therefrom, said elongated plate member being subsequently operable to place the looped strap under tension upon initial movement of said handle members toward each other, and for ejecting a surplus end portion, when severed from said tensioned strap, upon final movement of said handle members toward each other.

References Cited in the file of this patent

UNITED STATES PATENTS 2,559,845    Blum ___________________ July 10, 1951

FOREIGN PATENTS 562,071    Canada _________________ Aug. 19, 1958